United States Patent
Yang

(10) Patent No.: US 9,215,551 B2
(45) Date of Patent: Dec. 15, 2015

(54) RESOURCE MANAGEMENT IN MACHINE TO MACHINE NETWORKS

(71) Applicant: KT CORPORATION, Gyeonggi-do (KR)

(72) Inventor: Jeong-Yeop Yang, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 37 days.

(21) Appl. No.: 14/172,118

(22) Filed: Feb. 4, 2014

(65) Prior Publication Data

US 2014/0221032 A1    Aug. 7, 2014

(30) Foreign Application Priority Data

Feb. 4, 2013   (KR) .................. 10-2013-0012342

(51) Int. Cl.
*H04W 4/00* (2009.01)
*H04W 72/04* (2009.01)
*H04L 29/08* (2006.01)

(52) U.S. Cl.
CPC ............... *H04W 4/005* (2013.01); *H04L 67/16* (2013.01); *H04W 72/04* (2013.01)

(58) Field of Classification Search
CPC ....... H04L 67/16; H04W 4/005; H04W 72/04
USPC ......... 455/509, 452.1, 453, 456.2, 510, 456.1
See application file for complete search history.

(56) References Cited

U.S. PATENT DOCUMENTS

| 7,660,406 | B2 | 2/2010 | Fama et al. |
|---|---|---|---|
| 7,971,139 | B2 | 6/2011 | Stanciu et al. |
| 8,032,780 | B2 | 10/2011 | Koh et al. |
| 8,112,506 | B2 | 2/2012 | Son et al. |
| 8,180,379 | B2 | 5/2012 | Forstall et al. |
| 8,797,464 | B2 | 8/2014 | Kim et al. |
| 8,813,195 | B2 | 8/2014 | Wen et al. |
| 2004/0170262 | A1 | 9/2004 | Ohno |
| 2005/0152380 | A1 | 7/2005 | Lee et al. |
| 2007/0130280 | A1 | 6/2007 | Park et al. |
| 2007/0214262 | A1 | 9/2007 | Buchbinder et al. |
| 2008/0271123 | A1 | 10/2008 | Ollis et al. |
| 2010/0042720 | A1* | 2/2010 | Stienhans et al. ............. 709/226 |
| 2010/0210317 | A1 | 8/2010 | Kakehi |
| 2011/0106279 | A1 | 5/2011 | Cho et al. |
| 2011/0287748 | A1 | 11/2011 | Angel et al. |
| 2012/0065797 | A1 | 3/2012 | Brian et al. |
| 2012/0179547 | A1 | 7/2012 | Besore et al. |

(Continued)

FOREIGN PATENT DOCUMENTS

JP    11-184660 A    7/1999
JP    2005-340881 A    12/2005

(Continued)

*Primary Examiner* — John J Lee
(74) *Attorney, Agent, or Firm* — IP Legal Services, LLC

(57) ABSTRACT

The disclosure is related to managing resources in an M2M network. Particularly, the present disclosure relates to performing a resource management by using a substitute resource in place of a failure resource in an M2M network. More specifically, in the case that a failure occurs in a specific resource associated with a request message, the present embodiment may select a substitute resource using a correlation between resources, and transfer the request message to the selected substitute resource. Herein, the resource management may be performed by a virtual service capability layer (SCL).

20 Claims, 8 Drawing Sheets

(56) References Cited

U.S. PATENT DOCUMENTS

| | | |
|---|---|---|
| 2012/0209916 A1 | 8/2012 | Azuma et al. |
| 2013/0060358 A1 | 3/2013 | Li et al. |
| 2013/0147954 A1 | 6/2013 | Song et al. |
| 2013/0179593 A1 | 7/2013 | Dunlap et al. |
| 2013/0239205 A1 | 9/2013 | Jacobs et al. |
| 2013/0289752 A1 | 10/2013 | Orsat et al. |
| 2014/0215043 A1* | 7/2014 | Ryu et al. ............. 709/223 |
| 2014/0267907 A1 | 9/2014 | Downes et al. |
| 2014/0304385 A1 | 10/2014 | Lee et al. |
| 2014/0359675 A1 | 12/2014 | Mank |
| 2015/0055640 A1* | 2/2015 | Wang et al. ............. 370/338 |

FOREIGN PATENT DOCUMENTS

| KR | 10-1997-0057199 A | 7/1997 |
|---|---|---|
| KR | 10-2005-0049773 A | 5/2005 |
| KR | 10-2005-0062896 A | 6/2005 |
| KR | 10-2005-0073015 A | 7/2005 |
| KR | 10-2006-0008679 A | 1/2006 |
| KR | 10-2007-0058977 A | 6/2007 |
| KR | 10-2008-0051040 A | 6/2008 |
| KR | 10-2008-0096239 A | 10/2008 |
| KR | 10-2009-0030393 A | 3/2009 |
| KR | 10-2009-0118424 A | 11/2009 |
| KR | 10-2011-0009338 A | 1/2011 |
| KR | 10-2011-0047764 A | 5/2011 |
| KR | 10-2011-0059479 A | 6/2011 |
| KR | 10-2011-0066000 A | 6/2011 |
| KR | 10-2011-0066001 A | 6/2011 |
| KR | 10-1052074 B1 | 7/2011 |
| KR | 10-2012-0139777 A | 12/2012 |
| KR | 10-2013-0066829 A | 6/2013 |

* cited by examiner

S201 : Update/Create

S202 : Notify

S203 : Read

RESOURCE MANAGEMENT IN MACHINE TO MACHINE NETWORKS

CROSS REFERENCE TO PRIOR APPLICATIONS

The present application claims priority under 35 U.S.C. §119 to Korean Patent Application No. 10-2013-0012342 (filed on Feb. 4, 2013), which is hereby incorporated by reference in its entirety.

TECHNICAL FIELD

The present disclosure relates to performing a resource management in a machine to machine (M2M) network and, in particular, to replacing a specific resource with another resource (i.e., a substitute resource), when a failure occurs in the specific resource in an M2M network.

BACKGROUND

A machine to machine (M2M) communication refers to any communication scheme which does not require human intervention in the process of communication. In other words, the M2M communication refers to a communication for providing persons or intelligent equipment with object information using communication networks, or allowing persons or intelligent equipment to control states of objects. The M2M communication may be variously referred to as a machine type communication (MTC), Internet of things (IoT), a smart device communication (SDC), a machine oriented communication (MOC), or an object to object intelligent network (O2N).

A variety of technology such as a location awareness, a context awareness, an augmented reality, and so forth may be introduced in an M2M service or an M2M network. Accordingly, a purpose of the M2M communication is to further improve the quality and stability of M2M communication services, while automatically performing operations customized to users and/or situations without a human intervention or in a state in which a human intervention is minimized.

An M2M network communication may be employed for overcoming a variety of social issues (e.g., a disaster prevention, an energy saving) through u-City, u-Health, u-Transportation, u-Environment industries, and so forth. An M2M service associated with the M2M network communication may include a remote metering, a building/facility management, a vending machine management, an indoor lighting adjustment, a traffic information/vehicle control, an emergency rescue, a fire alarm, a security alarm, a telemetric, a wireless payment, and so forth. Particularly, the M2M service has recently been applied to medical equipment such as a pulsometer and an electrocardiograph. Accordingly, the M2M service is being actively applied to a variety of e-Health fields (e.g., a remote patient monitoring).

An M2M communication is an object-to-object communication. Therefore, the M2M communication may have different characteristics from a human-to-human (H2H) communication. Essential techniques may be changed due to such difference of characteristics. Necessary characteristics may be changed according to use fields of the M2M communication. Standard groups of all the countries of the world, including ETSI (European Telecommunication Standard Institute), have conducted research and development for successful M2M communication standardization.

Particularly, the present ETSI standard recognizes an M2M network, an M2M gateway, and an M2M device as 'resources' by applying the RESTful architecture, and adopts a scheme of managing the resources through a plurality of methods (e.g., CREATE/RETRIEVE/UPDATE/DELETE methods). Access to the resources is possible only if there is universal resource identifier (URI) information. In order to increase efficiency of access to the resources, a concept of 'announced resource' consisting of attribute of resource has been introduced.

A typical resource management according to the ETSI standard is performed based on the announced resources. Accordingly, a typical resource management may be effective as a scheme of finding a primary resource. However, in the case that a failure occurs in a called announced resource, the typical resource management merely processes as a failure of an access to the corresponding resource. Therefore, a resource fault recovery scheme may be necessary such as a replacement with another resource in the case that a failure occurs in the announced resource.

In addition, in the case that a specific resource is frequently accessed, there may be a need for minimizing or optimizing a preparation time or a response time for use of the corresponding resource, by considering a frequency of use associated with the corresponding resource.

For example, a typical M2M service according to the ETSI standard may provide e-Health service for a patient treatment. In this case, when a treatment device does not work properly, an access to the corresponding treatment device is merely processed as failure, without considering a substitute resource. Even in the case of medical devices for a repetitive (or continuous) treatment, the frequency or history associated with use thereof is not considered. Therefore, the same preparation time (i.e., resource preparation time) is required whenever an M2M service is provided, thereby making it difficult to provide a rapid M2M service.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a resource management in an M2M network may be performed by using a substitute resource in place of a failure resource. More specifically, in the case that a failure occurs in a specific resource in an M2M network, the present embodiment may replace a specific resource (e.g., M2M device) with other resource having a higher correlation. Herein, the resource management may be performed by a virtual service capability layer (SCL).

In accordance with an aspect of the present embodiment, a method may be provided performing a resource management in a machine to machine (M2M) network. The method may include receiving a request message associated with a specific resource from an issuer, determining a substitute resource to replace the specific resource, based on correlation information between resources when the specific resource is unavailable, obtaining location information of a service capability layer (SCL) where the substitute resource resides, and transferring the request message to the SCL of the substitute resource by using the location information.

At least one of the receiving, the determining, the obtaining, and the transferring may be performed by a virtual SCL included in at least one M2M entity in the M2M network.

The correlation information may include at least one of correlation coefficients for reachability of the resources and correlation coefficients for reusability of the resources.

The correlation coefficients for the reachability may be calculated based on a history of accesses to each of the resources. The correlation coefficients for the reusability may calculated based on a history of calls from other resources with respect to each of the resources.

The correlation coefficients for the reachability may be calculated using 'device reachability, addressing and repository' (DRAR) and 'gateway reachability, addressing and repository' (GRAR). The correlation coefficients for the reusability may be calculated using 'device history and data retention' (DHDR) and 'gateway history and data retention' (GHDR).

The correlation information may include correlation information between announced resources associated with the M2M network.

The obtaining the location information may include requesting, by the virtual SCL, the location information to an announced-to SCL, and obtaining, by the virtual SCL, the location information of the SCL from the announced-to SCL.

The location information of the SCL may include a universal resource identifier (URI) of the SCL where the substitute resource resides.

The transferring the request message may include transferring hop type information of the substitute resource together with the request message.

The determining the substitute resource may include retrieving one or more substitute resource candidates, based on the correlation information between the resources, and determining a substitute resource candidate having a greatest correlation coefficient, as the substitute resource.

The determining the substitute resource may include re-determining a substitute resource candidate having a next-greatest correlation coefficient, as the substitute resource, when a response message to the request message is not received from the SCL of the substitute resource.

The method may further include transferring the request message to an SCL where the specific resource resides, when the specific resource is available.

The transferring the request message to the SCL of the specific resource may further include transmitting hop type information of the specific resource to the SCL of the specific resource.

In accordance with another embodiment, an apparatus may be provided for performing a resource management in a machine to machine (M2M) network. The apparatus may include a monitoring processor, an analysis processor, and a virtual SCL creation processor. Monitoring processor may be configured to collect attributes of resources associated with the M2M network. The analysis processor may be configured to analyze the collected attributes of the resources and to obtain information on correlation between the resources. The virtual SCL creation processor may be configured to create a virtual SCL based on the correlation information. Herein, the virtual SCL may be configured to (i) receive a request message from an issuer, (ii) select a substitute resource based on the correlation information, when a resource associated with the request message is unavailable, (iii) obtain location information on the selected substitute resource, and (iv) transfer the request message to an SCL of the substitute resource by using the location information.

The virtual SCL may be configured to retrieve one or more substitute resource candidates based on the correlation information, and to determine a substitute resource candidate having a greatest correlation coefficient, as the substitute resource.

The virtual SCL may be configured to re-determine a substitute resource candidate having a next-greatest correlation coefficient, as the substitute resource, when a response message responding to the request message is not received from the SCL of the substitute resource.

When transferring the request message to the selected substitute resource, the virtual SCL may be configured to transfer hop type information of the substitute resource together with the request message.

The correlation information may be correlation information between announced resources associated with the M2M network.

The virtual SCL creation processor may be configured to update the virtual SCL at least one of (i) when an architecture of the M2M network is changed and (ii) when request and response processes are performed between the resources.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
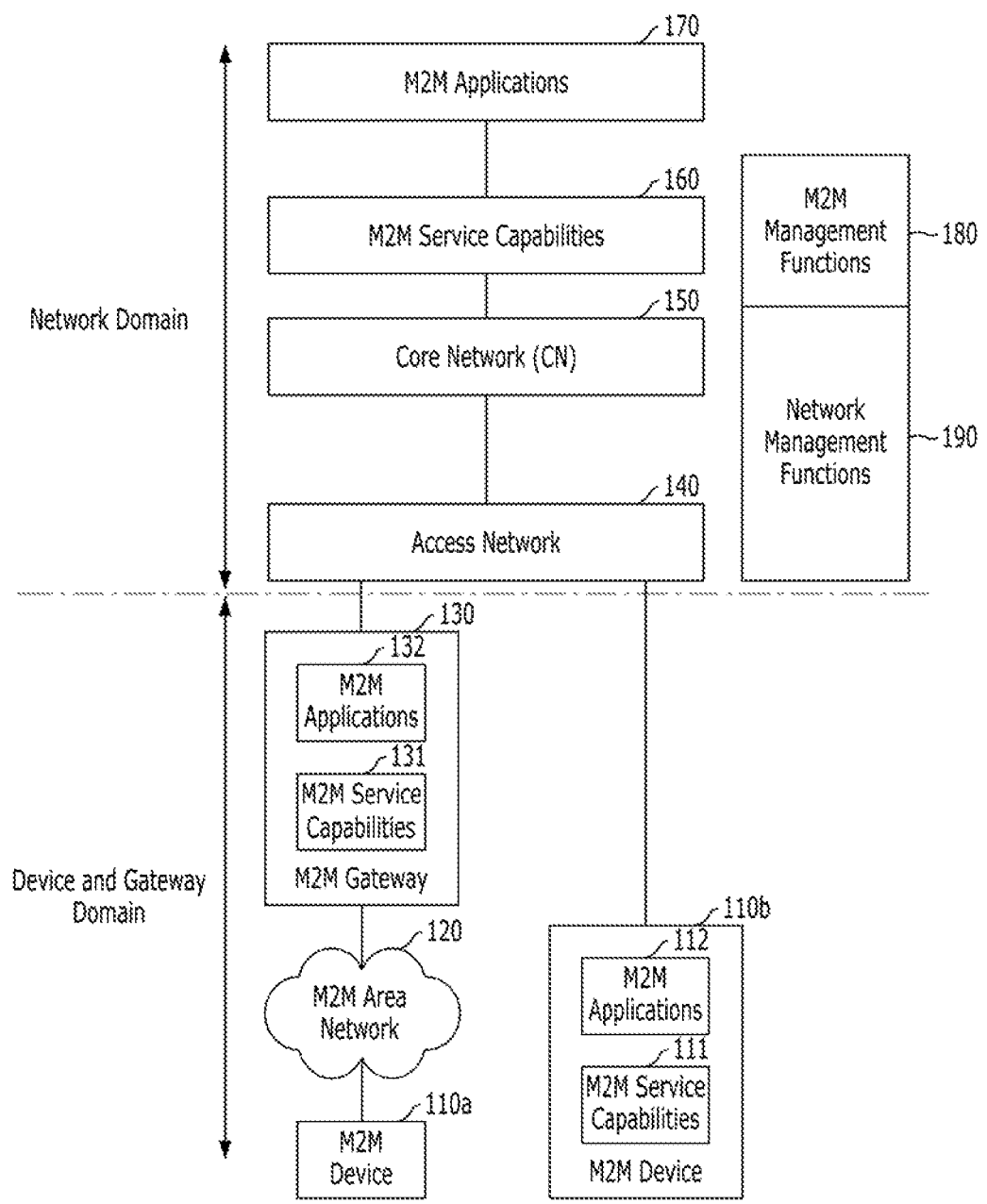
FIG. 1 illustrates a typical architecture for M2M services according to the ETSI standard.

Reference will now be made in detail to exemplary embodiments of the present invention, examples of which are illustrated in the accompanying drawings, wherein like reference numerals refer to like elements throughout. The embodiments are described below, in order to explain embodiments of the present invention by referring to the figures.

The present embodiment may perform a resource management by using a substitute resource in place of a failure resource in an M2M network. More specifically, in the case that a failure occurs in a specific resource associated with a request message, the present embodiment may select a substitute resource using a correlation between resources, and transfer the request message to the selected substitute resource. Herein, the resource management may be performed by a virtual service capability layer (SCL). Furthermore, when transferring the request message to the selected substitute resource, corresponding hop type information may be transferred together.

FIG. 1 illustrates a typical architecture for M2M services according to the ETSI standard.

Referring to FIG. 1, M2M devices 110a and 110b are terminals that perform communication without a human intervention or in a state in which human intervention is minimized. In particular, M2M devices 110 and 110b may refer to any type of devices that send and forward data stored therein, in response to an external request or automatically.

According to the ETSI standard, in the case that M2M device 110b directly connects to access network 140, M2M device 110b may run M2M applications 112 using M2M service capabilities (SCs) 111. Herein, the M2M applications 112 may be referred to as "device applications (DAs)." Meanwhile, M2M device 110a may connect to access network 140 via M2M gateway 130. In this case, M2M device 110a may use M2M service capabilities (SCs) 131 of M2M gateway 130.

M2M area network 120 may provide connectivity between M2M device 110a and M2M gateway 130. For example, M2M area network 120 may include a personal area network (PAN) and/or a local area network (LAN), but is not limited thereto. The PAN may include IEEE 802.15.x, Zigbee, Bluetooth, IETF ROLL, ISA100.11a, and so forth. The LAN may include PLC, M-BUS, Wireless M-BSU, KNX, and so forth.

M2M gateway 130 may run M2M applications 132 using M2M service capabilities (SCs) 131. Herein, M2M applications 132 may be referred to as "gateway applications (GAs). M2M gateway 130 may act as a proxy between M2M device 110a and access network 140.

Access network 140 may allow M2M device 110b and/or M2M gateway 130 to communicate with core network (CN) 150. For example, access network 140 may include xDSL, HFC, FTTH, PLC, satellite, GERAN, UTRAN, eUTRAN, Wireless LAN, and/or WiMAX (WiBro), but is not limited thereto.

Core network (CN) 150 may provide an IP connectivity, an access network control, network/service control functions, an interconnection with other networks, roaming functions, and so forth. For example, core network 150 may include 3GPP CN, ETSI TISPAN CN, 3GPP2 CN, and/or IMS, but is not limited thereto.

M2M service capabilities (SCs) 160 in a network domain may provide functions that are to be shared by different applications, and environments that allow access to other service capabilities through open interfaces. The use of such M2M service capabilities may make it possible to develop and deploy optimized applications without considering characteristics of lower network layers.

M2M applications 170 of the network domain may run an M2M service logic and use M2M service capabilities through an open interface provided in the M2M system. Herein, M2M applications 170 may be referred to as "network applications (NAs)."

Referring to FIG. 1, the network domain may include M2M management functions 180 and network management functions 190. M2M management functions 180 may include all the functions required to manage M2M service capabilities 160 in the network domain. The management of the M2M devices (e.g., 110a, 110b) and the M2M gateways (e.g., 130) may use a specific M2M service capability. Network management functions 190 may include all the functions required to manage access network 140 and core network 150. Network management functions 190 may include a variety of functions such as a provisioning, a supervision, a fault management, and so forth.

According to the ETSI standard, M2M service capabilities 160 in the network domain may be referred to as a network service capabilities layer (NSCL). M2M service capabilities 131 in M2M gateway 130 may be referred to as a gateway service capabilities layer (GSCL). M2M service capabilities (e.g., 111) in M2M devices (e.g., 110a, 110b) may be referred to as a device service capabilities layer (DSCL). The NSCL, the GSCL, and the DSCL may be collectively referred to as a service capabilities layer (SCL). The NSCL may refer to individual platforms established for services by M2M service providers.

The service capabilities (SCs) of the GSCL may include the following SCs. A 'gateway reachability, addressing and repository' (GRAR) capability may provide the functionalities of: (i) managing a reachability status of an M2M device and scheduling information pertaining to a reachability of the M2M device; (ii) allowing to create, delete and list a group of M2M devices; and (iii) storing M2M applications (e.g., NA, DA, and GA) and SCL (e.g., GSCL or NSCL) data and making it available.

A 'gateway history and data retention' (GHDR) capability may provide the functionality of archiving relevant information pertaining to messages exchanged over a reference point or internally to the GSCL.

Like the GSCL, the SCs of the DSCL may include a 'device reachability, addressing and repository' (DRAR) capability and a 'device history and data retention'(DHDR) capability. Herein, the DRAR capability may provide the functionalities of: (i) allowing to create, delete and list a group of M2M devices, (ii) storing DA related registration information and NSCL information, and (iii) informing the NSCL about reachability and scheduling information pertaining to reachability of the M2M devices. The DHDR capability may provide the functionality of archiving relevant information pertaining to messages exchanged over a reference point and/or internally to the DSCL.

The ETSI standard specifies how M2M applications (DA, GA, or NA) and M2M SCLs exchange information with each other by applying RESTful architecture to an M2M network. Representational state transfer (REST) refers to a software architecture style. The "REST" may be used for data access on a web. Such RESTful web service may have a characteristic that is accessible with only an HTTP protocol, regardless of server/client types, as long as a resource URI is known. The ETSI standard specifies a method of transferring representation information associated with resources uniquely defined using the RESTful architecture. In addition, the ETSI standard defines specification about resources that reside in an SCL.

Figure 2:
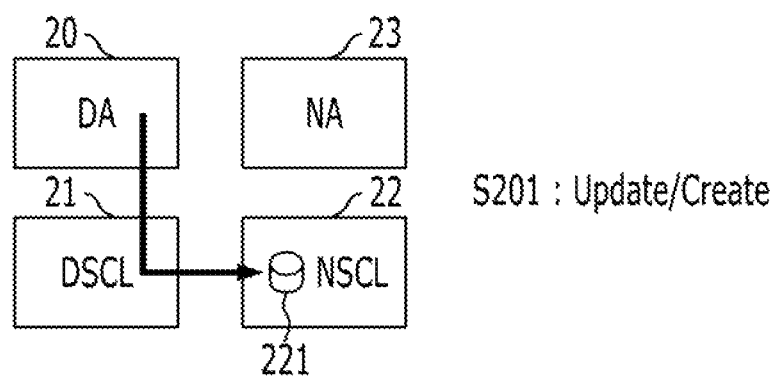
FIG. 2 illustrates a typical data exchange procedure using SCL resources according to the ETSI standard.
Figure 2:
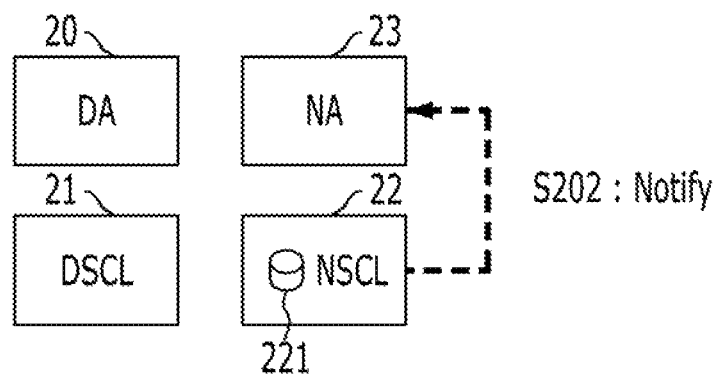
Figure 2:
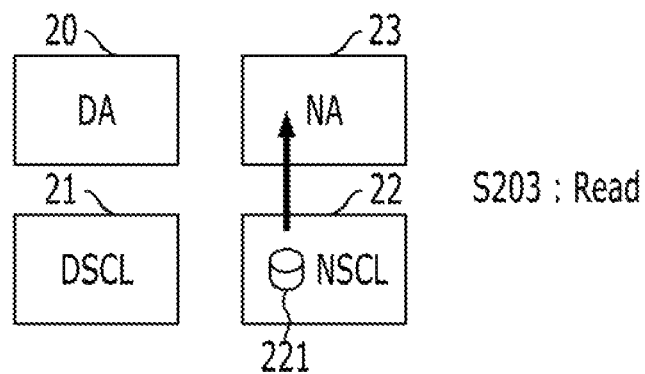

FIG. 2 illustrates a typical data exchange procedure using SCL resources according to the ETSI standard. That is, FIG. 2 illustrates how M2M applications (e.g., DA, NA, etc.) and/or M2M SCLs (e.g., DSCL, NSCL, etc.) exchange information (or data) with each other. For example, as shown in FIG. 2, an M2M application (e.g., DA) may send some data to another application (e.g., NA) on the M2M network by means of M2M SCLs. More specifically, DA 20 writes data to a resource in NSCL 221, and NA 23 read that resource. In this case, NA 23 may be notified by NSCL 22 upon the writing (update) of the resource by DA 20. Meanwhile, an arrow direction in FIG. 2 represents not an operation flow but a data flow.

Referring to FIG. 2, at step S201, when data (resource data) associated with an M2M device is updated/created, DA 20 may write the created/updated data to container 221 of NSCL 22 through DSCL 21.

At step S202, NSCL 22 may notify NA 23 about the writing (update) of the data. At step S203, when receiving a notification from NSCL 22, NA 23 may read the data from container 221 of NSCL 22.

As in the example of FIG. 2, a 'resource' may be a uniquely addressable entity in the RESTful architecture of the ETSI standard. The resource may have a representation that shall be transferred and manipulated with verbs. The resource may addressed using a universal resource identifier (URI).

Methods associated with the verbs described above in the ETSI standard may be referred to as CRUD methods (e.g., CREATE, RETRIEVE, UPDATE, and DELETE). In other words, when handling resources in a RESTful architecture, there are four basic methods (e.g., CREATE, RETRIEVE, UPDATE, and DELETE) that are applied to resources.

In addition to these basic methods, additional methods such as "NOTIFY" and "EXECUTE" may be defined. The "NOTIFY" method may be used to indicate an operation for reporting a notification about a change of a resource as a consequence of a subscription. The "NOTIFY" method may map to a response of a "RETRIEVE" method in case that a long polling mechanism is used, or to an "UPDATE" method in case that an asynchronous mechanism is used. The "EXECUTE" method may be used for executing a management command/task which is represented by a resource. The "EXECUTE" method may correspond to an "UPDATE" method without any payload data.

According to the ETSI standard, an 'actor' performing a request may be defined as an 'issuer.' The issuer may be either an M2M application or an SCL. The content of an 'announced resource' may refer to a resource hosted by a hosting SCL (Master/original resource). The purpose of the announced resource is to facilitate a discovery of an original resource, so that the issuer of the discovery does not have to contact all SCLs in order to find the resource.

With respect to SCLs, more details will be described below. As described in the ETSI standard, a local SCL may be the SCL where an application or an SCL shall register to. The local SCL may be a first SCL that receives a request from an original issuer (e.g., an application or an SCL) of the request. If an NA is the original issuer, the local SCL may be a corresponding NSCL. If a GA is the original issuer, the local SCL may be a corresponding GSCL. If a DA in a D device (e.g., 110b) is the original issuer, the local SCL may be a corresponding DSCL. If a DA in a D' device (e.g., 110a) is the original issuer, the local SCL may be a corresponding GSCL. If a GSCL is the original issuer, the local SCL may be a corresponding NSCL. If the DSCL in a D device is the original issuer, the local SCL may be a corresponding NSCL or GSCL. The hosting SCL may be the SCL where an addressed resource resides.

A resource may be announced to multiple SCLs. In this case, an SCL that contains the announced resource may be referred to as an announced-to SCL. Herein, the announced resource may point to the original resource hosted in another SCL. The announced resource may be configured with a limited set of attributes, which are searchStrings, a link to the original resource, and an access right. The purpose of the announced resource is to facilitate a discovery of the original resource when querying the announced-to SCL, so that the issuer of the discovery does not have to contact all SCLs in order to find the resources. The announced resource itself may be directly accessed through its full URI. During a discovery process, a direct reference to the original resource may be returned. The ETSI standard defines that only locally created resources can be announced. Removing an announced resource, for example, due to deregistration of an SCL may not remove the original resource. Reversely, when the original resource is removed, an announced resource may be removed.

Figure 3A:
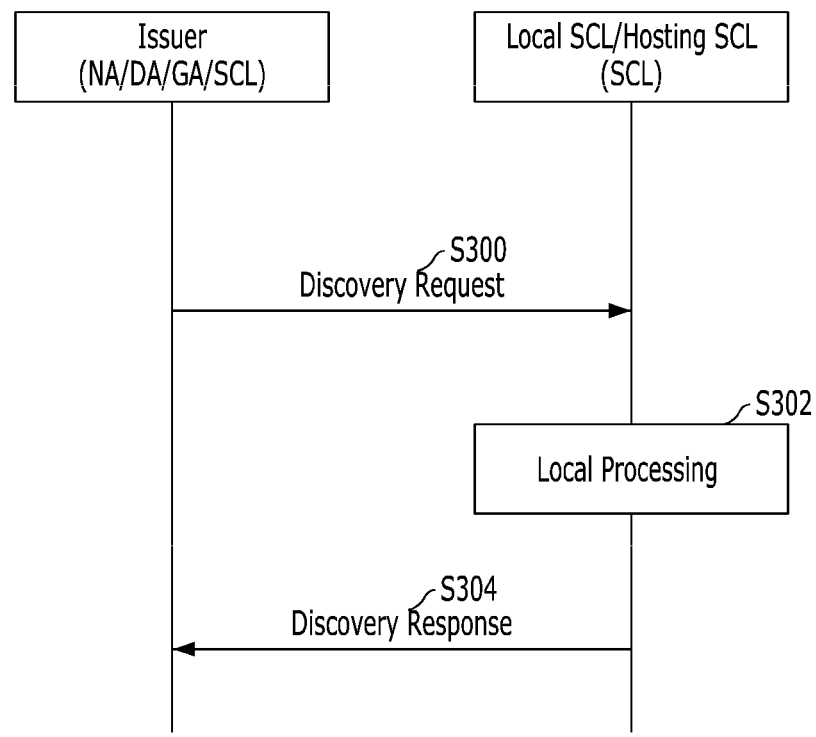
FIG. 3A illustrates a typical 'RETRIEVE' operation in the case that no hop is needed, according to the ETSI standard.
Figure 3B:
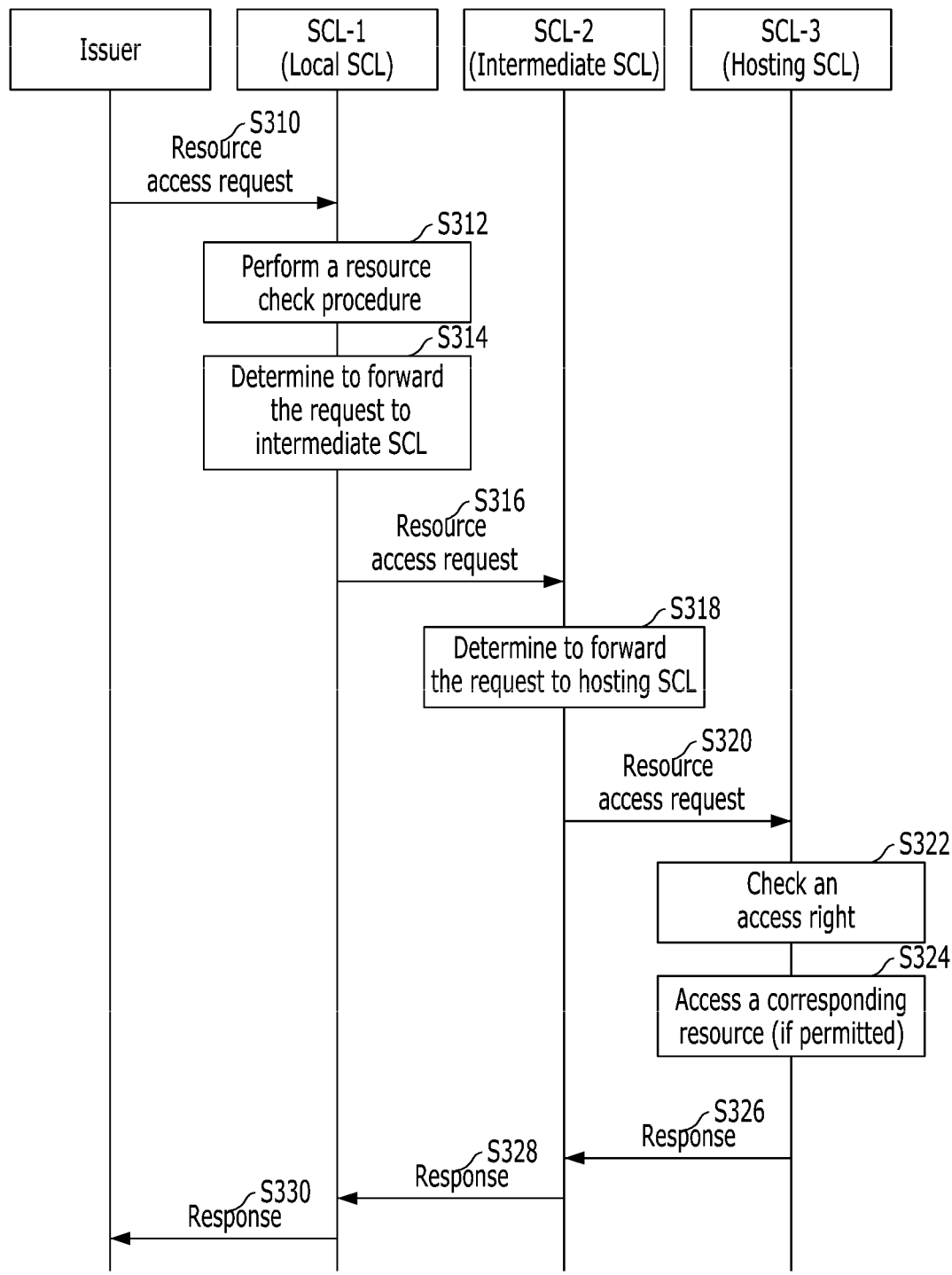
FIG. 3B illustrates a typical procedure of accessing a resource in a hosting SCL through a 2-hop scheme according to the ETSI standard.

FIG. 3A illustrates a typical 'RETRIEVE' operation, in the case that no hop is needed, according to the ETSI standard. FIG. 3B illustrates a typical procedure of accessing a resource in a hosting SCL through a 2-hop scheme according to the ETSI standard. Particularly, FIG. 3A illustrates a message flow of a discovery procedure in the case that no hop is needed. FIG. 3B illustrates a message flow of a discovery procedure in the case that 2 hops are needed. Herein, a hop scheme (e.g., no hop, 2-hop) may be determined according to a location of an original resource.

First, a 'RETRIEVE' operation of CREATE/RETRIEVE/UPDATE/ELETE ("CRUD") operations will be described in more detail with reference to FIG. 3A. For example, as shown in FIG. 3A, a local SCL and a hosting SCL may be the same entities, and therefore no hop is needed. At step S300, in order to access a certain resource, an issuer may send a request for a resource discovery, to a local SCL/hosting SCL. Herein, the issuer may be one of a NA, a DA, a GA, and an SCL. In this case, a "RETRIEVE" method may be employed.

At step S302, when receiving the request, the local SCL/hosting SCL may check an access right for the resource, and perform a local processing procedure. More specifically, the local SCL/hosting SCL may perform the local processing procedure discovering the specific resource.

At step S304, the local SCL/hosting SCL may send a discovery response to the issuer according to discovery results. More specifically, if a corresponding resource is found, the local SCL/hosting SCL may send a success response to the issuer. Herein, the success response may include URI information of a discovered resource. If a corresponding resource is not found, the local SCL/hosting SCL may send an error response to the issuer.

Meanwhile, FIG. 3B illustrates a case that 2-hop is needed to access a resource. For example, in the case that (i) a local SCL (SCL-1), an intermediate SCL (SCL-2), and a hosting SCL (SCL-3) are different from one another, and (ii) an issuer may not directly communicate with the hosting SCL, 2-hop may be required.

As described above with reference to FIG. 3A, at step S310, an issuer may send a resource access request to the local SCL (SCL-1) in order to access a specific resource.

At step S312, the local SCL (SCL-1) may perform a resource check procedure. More specifically, the local SCL (SCL-1) may determine whether the local SCL (SCL-1) has the requested resource (i.e., addressed resource).

At step S314, when the local SCL (SCL-1) does not have the requested resource (i.e., addressed resource), the local SCL (SCL-1) may determine to forward the resource access request. Particularly, if the local SCL (SCL-1) cannot directly communicate with the hosting SCL (SCL-3), the local SCL (SCL-1) may determine to forward the resource access request to the intermediate SCL (SCL-2) (e.g., NSCL) pre-registered in the local SCL (SCL-1).

At step S316, the local SCL (SCL-1) may forward the resource access request to the intermediate SCL (SCL-2). Before forwarding the resource access request, the local SCL (SCL-1) may optionally check access rights and syntax.

At step S318, when receiving the resource access request, the intermediate SCL (SCL-2) may determine to forward the resource access request to the hosting SCL SCL-y preregistered in the intermediate SCL (SCL-2).

At step S320, the intermediate SCL (SCL-2) may forward the resource access request to the hosting SCL (SCL-3). Before forwarding the resource access request, the intermediate SCL (SCL-2) may optionally check access rights and syntax.

At step S322, the hosting SCL (SCL-3) may check the access right(s) for a corresponding resource (i.e., the requested resource). At step S324, if permitted, the hosting SCL (SCL-3) may access the requested resource, and create a success response message for the issuer. Meanwhile, if the issuer does not an access right, the hosting SCL (SCL-3) may create an error response.

At steps S326, S328 and S330, the hosting SCL (SCL-3) may send a success response or an error response to the issuer, through the intermediate SCL (SCL-2) and the local SCL (SCL-1). In other words, a success response or an error response from the hosting SCL (SCL-3) may be sequentially forwarded to the SCLs (SCL-2, SCL-1) and the issuer.

Figure 4:
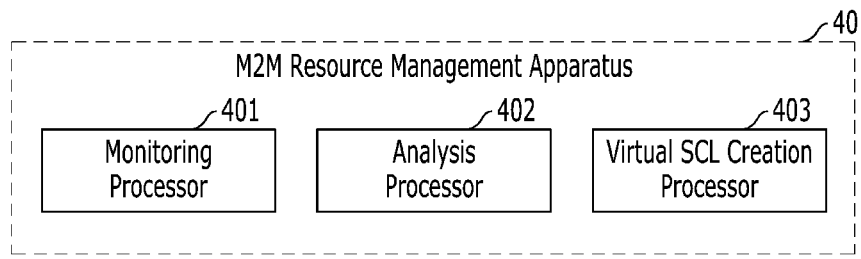
FIG. 4 illustrates an M2M resource management apparatus in accordance with at least one embodiment.

FIG. 4 illustrates an M2M resource management apparatus in accordance with at least one embodiment.

M2M resource management apparatus 40 in accordance with at least one embodiment may be included in at least one M2M entity provided in a device and gateway domain and/or a network domain. Alternatively, M2M resource management apparatus 400 may be implemented as a separate independent entity. An M2M resource management apparatus (e.g., 40) according to the present embodiment may perform a resource management in an M2M network, and include at least one hardware processor. More specifically, at least one of constituent elements (e.g., 401, 402, 403) may be configured with a hardware processor. As shown in FIG. 4, M2M resource management apparatus 40 may include monitoring processor 401, analysis processor 402, and virtual SCL creation processor 403.

Monitoring processor 401 may collect attributes of resources associated with the M2M network. In other embodiments, monitoring processor 401 may monitor whether announced resources exist at least one of (i) when an M2M network is first constructed, (ii) when the M2M network is reconstructed due to addition/deletion/change of new M2M devices, i.e., when the architecture of the M2M network is changed, and (iii) when a request for resources from an issuer is generated and the issuer receives a corresponding response (i.e., when call (request) and response processes are performed between the resources).

In this case, when it is determined that the announced resources exist, monitoring processor 40 may collect attributes of the announced resources. In other embodiments, analysis processor 402 may collect attributes of resources associated with the M2M network.

Analysis processor 402 may analyze the collected attributes of the resources and create information on correlation between the resources. In other embodiments, in the case that monitoring processor 40 collects attributes of the announced resources, analysis processor 402 may analyze the collected attributes of the announced resources and create information on correlation between the announced resources. Hereinafter, for convenience of descriptions, correlation between the resources associated with the M2M network will be described in more detail. However, such correlation determination scheme may be identically applied to a case of determining correlations between the announced resources.

The correlation between resources, which is analyzed by analysis processor 402, may include "correlation for reachability of each resource" and/or "correlation for reusability of each resource."

The correlation for the reachability of the resource may use 'reachability, addressing and repository' (RAR) among M2M service capabilities (SCs). That is, analysis processor 402 may collectively analyze mapping information, a reachability, and scheduling information with respect to M2M entities (e.g., M2M devices and/or M2M gateways) by using RARs of the M2M entities. Herein, the RAR may be an RAR according to the ETSI standard. Analysis processor 402 may calculate correlations for reachability of resources, based on the analysis results. The calculated correlations may indicate correlations associated with a situation in which a corresponding resource is used. The correlation for reachability of each resource may be calculated by a correlation coefficient formula as expressed in Equation 1 below.

$$\text{correlation\_of\_reachable\_coefficient} = \frac{\Sigma(DRAR - \overline{DRAR})(GRAR - \overline{GRAR})}{\sqrt{\Sigma(DRAR - \overline{DRAR})^2} \times \sqrt{\Sigma(GRAR - \overline{GRAR})^2}} \quad \text{[Equation 1]}$$

Equation 1 above may be a correlation coefficient calculation formula based on an access history associated with each resource (e.g., a history of accesses to each resource). In Equation 1, "DRAR" represents the number of returns (or responses) of 'a resource value' and/or 'a URI value' requested by a GSCL or an NSCL attempting to access a corresponding M2M device. "GRAR" represents the number of returns (or responses) of 'a resource value' and/or 'a URI value' requested by a DSCL or an NSCL attempting to access a corresponding M2M gateway. $\overline{DRAR}$ and $\overline{GRAR}$ represent average values of DRARs and GRARs, respectively.

In addition, analysis processor 402 may analyze a reusability of each resource. In particular, analysis processor 402 may calculate correlation for reusability of each resource by using 'history and data retention' (HDR) among M2M service capabilities (SCs). That is, analysis processor 402 may analyze an access frequency and/or a call frequency associated with resources, by using HDRs of M2M devices and/or M2M gateways. Herein, the HDR may be an HDR according to the ETSI standard. Analysis processor 402 may calculate correlations for reusability of resources based on the analysis result. The calculated correlation may indicate a correlation for which resources of M2M entities (e.g., M2M devices or M2M gateways) are interworked and how frequently the resources are used. The correlation for reusability of each resource may be calculated by a correlation coefficient formula as expressed in Equation 2 below.

$$\text{correlation\_of\_reusable\_coefficient} = \frac{\Sigma(DHDR - \overline{DHDR})(GHDR - \overline{GHDR})}{\sqrt{(DHDR - \overline{DHDR})^2} \times \sqrt{\Sigma(GHDR - \overline{GHDR})^2}} \quad \text{[Equation 2]}$$

Equation 2 above may be a correlation coefficient calculation formula based on a history of calls from other resources with respect to each resource. Assuming that each M2M device (e.g., device A) is a resource, 'DHDR' represents how many other resources (e.g., device B) call a corresponding resource (e.g., device A) and/or deliver values to the corresponding resource (e.g., device A). Assuming that each gateway is a resource, GHDR represents how many another resource calls a corresponding resource or delivers a value. $\overline{DHDR}$ and $\overline{GHDR}$ represent average values of DHDRs and GHDRs, respectively.

In summary, as described in Equation 1, a correlation coefficient for reachability of each resource may be calculated using "reachability, addressing and repository" (RAR) (e.g., DRAR, GRAR) among SCL capabilities of an M2M device and an M2M gateway. As described in Equation 2, a correlation coefficient for reachability and reusability of each resource may be calculated using "history and data retention" (HDR) (e.g., DHDR, GHDR) among SCL capabilities of an M2M device and an M2M gateway. The correlation coefficient for reachability and the correlation coefficient for reachability may be calculated for each resource. However, Equation 1 and Equation 2 are merely exemplary, and it will be understood by those skilled in the art that known or other correlation coefficient formulas may also be used to calculate the correlation for reachability and reusability of resources.

Meanwhile, virtual SCL creation processor 403 may create a virtual service capability layer (SCL), based on correlation information created (or calculated) in analysis processor 402. Herein, the created virtual SCL may reside in one or more M2M entities (e.g., an M2M devices and/or an M2M gateway) of a corresponding M2M network. The resource structure of the virtual SCL will be described below in detail with reference to FIG. 5. Furthermore, such creation operation of the virtual SCL will be described in more detail with reference to FIG. 6.

The virtual SCL may be configured to (i) receive a request message from an issuer, (ii) select a substitute resource based on the correlation information, when a resource associated with the request message is unavailable, (iii) obtain location information on the selected substitute resource, and (iv) transfer the request message to an SCL of the substitute resource by using the location information.

More specifically, when a resource request (i.e., a resource request message) is generated from an issuer, the virtual SCL may determine whether a resource response associated with the resource request is possible. When the resource response is possible, the virtual SCL may obtain a location of a corresponding resource and directly forward the resource request to the corresponding resource. When the resource response is impossible, a substitute resource may be determined based on correlation information created by analysis processor 402, the virtual SCL may forward the resource request to the substitute resource. Such operations of the virtual SCL will be described in more detail with reference to FIG. 7 and FIG. 8.

Figure 5:
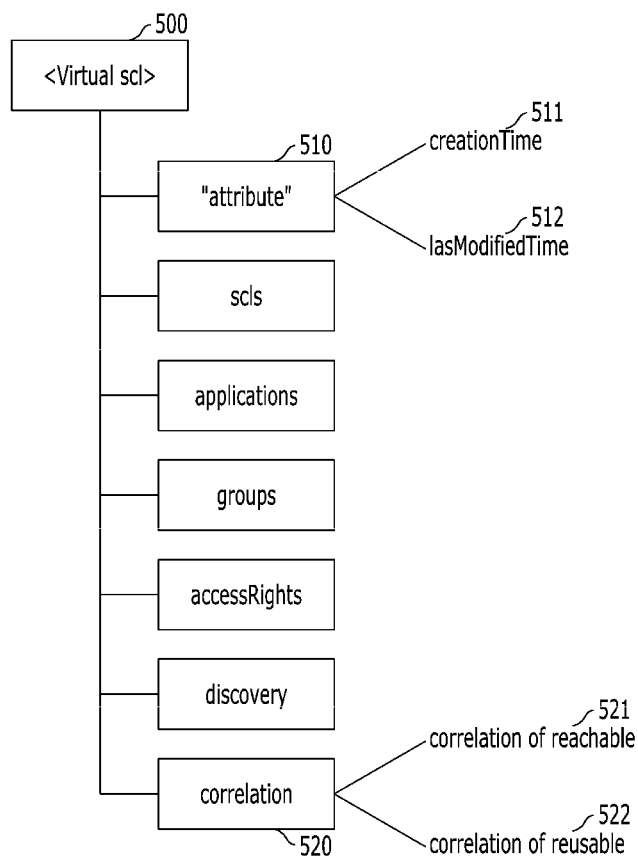
FIG. 5 illustrates a resource structure of a virtual SCL in accordance with at least one embodiment.

FIG. 5 illustrates a resource structure of a virtual SCL in accordance with at least one embodiment. More specifically, FIG. 5 illustrates a resource structure of a virtual SCL created by virtual SCL creation processor 403.

Like a typical resource structure, the virtual SCL defined as <virtual scl> 500 may include a plurality of resources such as "attribute", scls, applications, groups, accessRights, and discovery. "Attribute" 510 may include "creationTime" 511 that is information on a creation time of a resource, and "last-ModifiedTime" 512 that is information on last modified time.

Unlike the typical resource structure, the virtual SCL in accordance with at least one embodiment may further include correlation resource 502. The correlation resource may include "correlation of reachable" 521 and "correlation of reusable" 522 as shown in FIG. 5. Herein, the "correlation of reachable" 521 may be associated with 'correlations for reachability of resources' described in FIG. 4. The "correlation of reusable" 522 may be associated with 'correlations for reusability of resources' described in FIG. 4. For example, the "correlation of reachable" 521 and the "correlation of reusable" 522 may include a URI for a corresponding correlation table. The correlation table may include correlation coefficient values for reachability and reusability of each resource".

Figure 6:
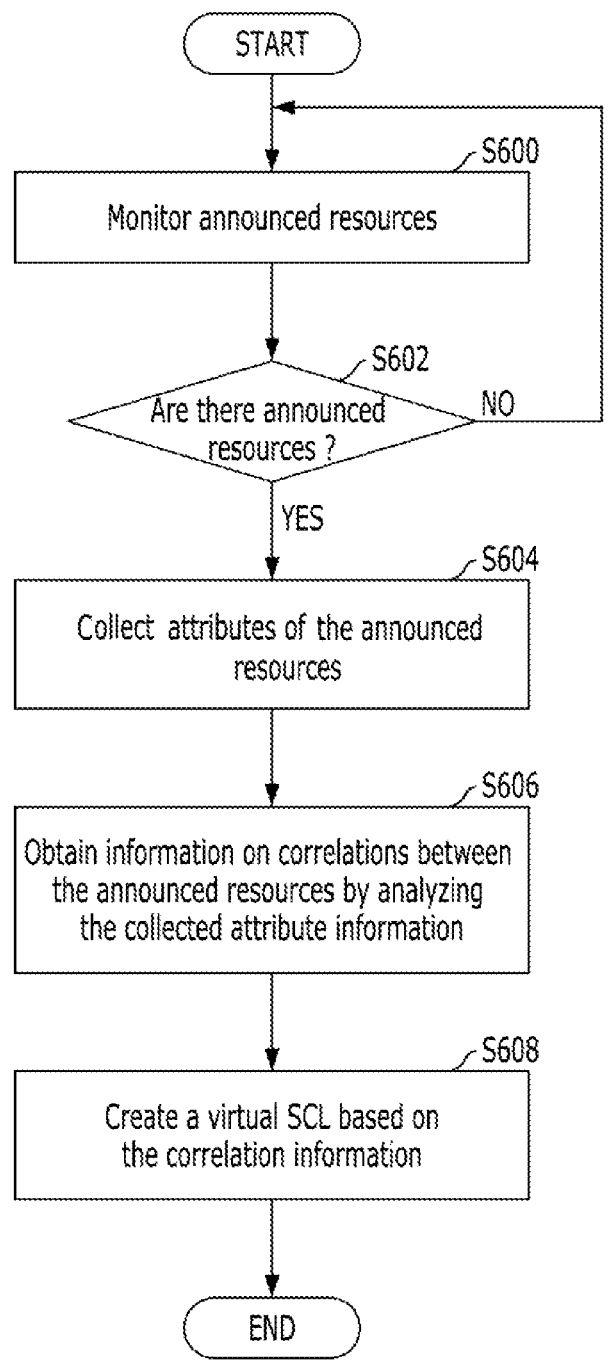
FIG. 6 illustrates a method of creating and updating a virtual SCL in accordance with at least one embodiment.

FIG. 6 illustrates a method of creating and updating a virtual SCL in accordance with at least one embodiment. For example, the virtual SCL creation process as shown in FIG. 6 may be performed when an M2M network is first constructed.

Referring to FIG. 6, at step S600, monitoring processor 401 may monitor whether there are announced resources among resources associated with a corresponding M2M network.

When the announced resources do not exist (No—S602), monitoring processor 401 may repeat the monitoring process (S600) until the announced resources exist. The announced resources may be managed in an announced-to SCL.

At step S604, when the announced resources exist (Yes—S602), monitoring processor 401 may collect attributes of the announced resources. In other embodiments, monitoring processor 401 may collect attributes of all or parts of resources associated with the corresponding M2M network.

At step S606, analysis processor 402 may obtain (or create) information (e.g., correlation coefficient values) on correlations between the announced resources, based on the collected attributes. More specifically, analysis processor 402 may analyze the collected attributes of the announced resources, and create information (e.g., correlation coefficient values) on correlations between the announced resources using the above-described scheme (e.g., Equation 1 and Equation 2). Herein, the correlation information may be created in a form of a table. Since a creation (calculation) operation of correlation information (e.g., correlation coefficient values) was already described with reference to FIG. 4, the detailed descriptions thereof are omitted.

At step S608, virtual SCL creation processor 403 may create a virtual SCL, based on the correlation information obtained at step S606. Herein, the virtual SCL may store (i) the correlation information (e.g., a correlation table) or (ii) a URI of the correlation information so as to preferentially process a request from an issuer for M2M resources. Since a creation operation of a virtual SCL and a resource structure of the virtual SCL were already described with reference to FIG. 4 and FIG. 5, the detailed descriptions thereof are omitted.

Figure 7:
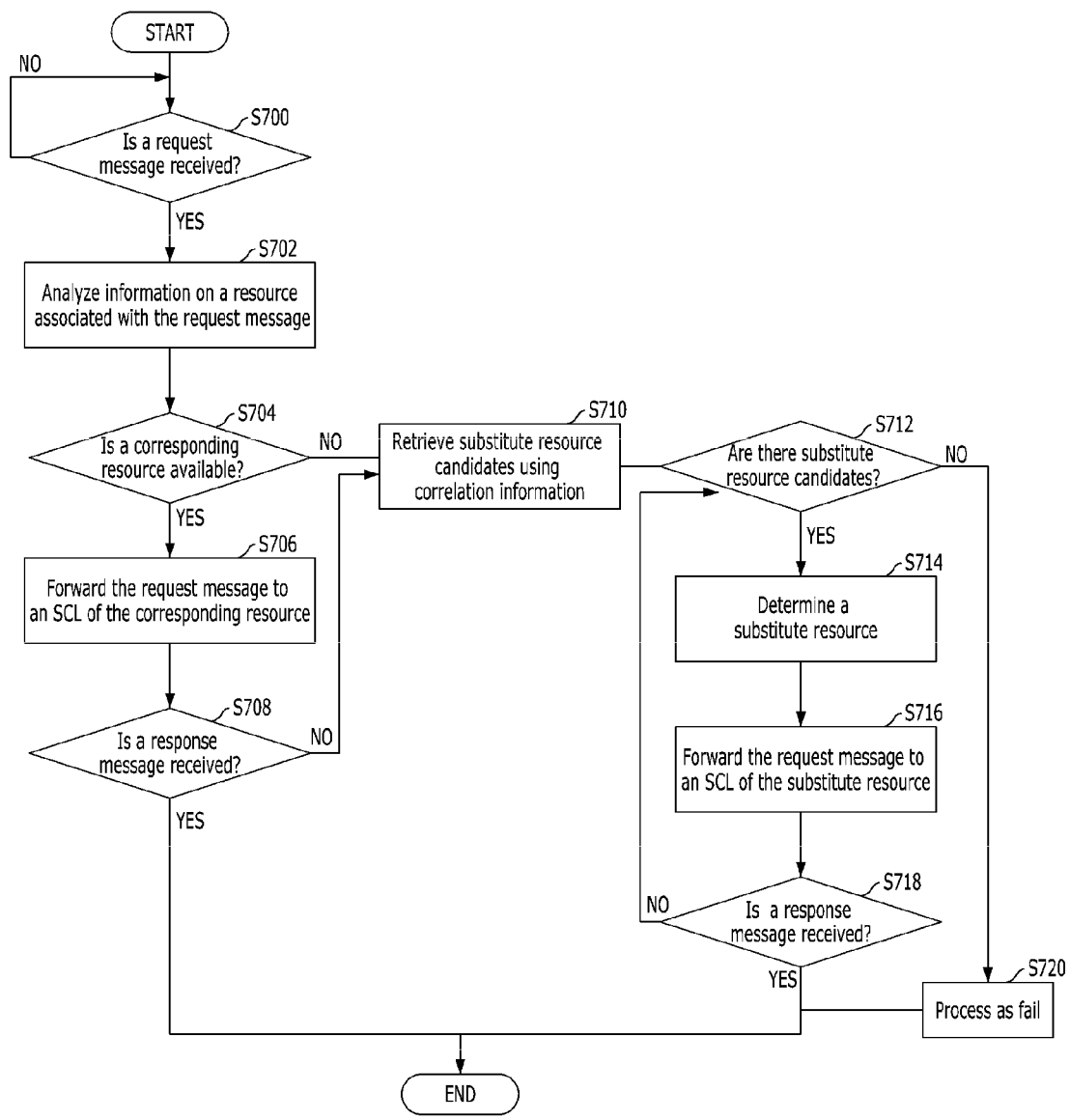
FIG. 7 illustrates a method of managing resources in a virtual SCL in accordance with at least one embodiment.
Figure 8:
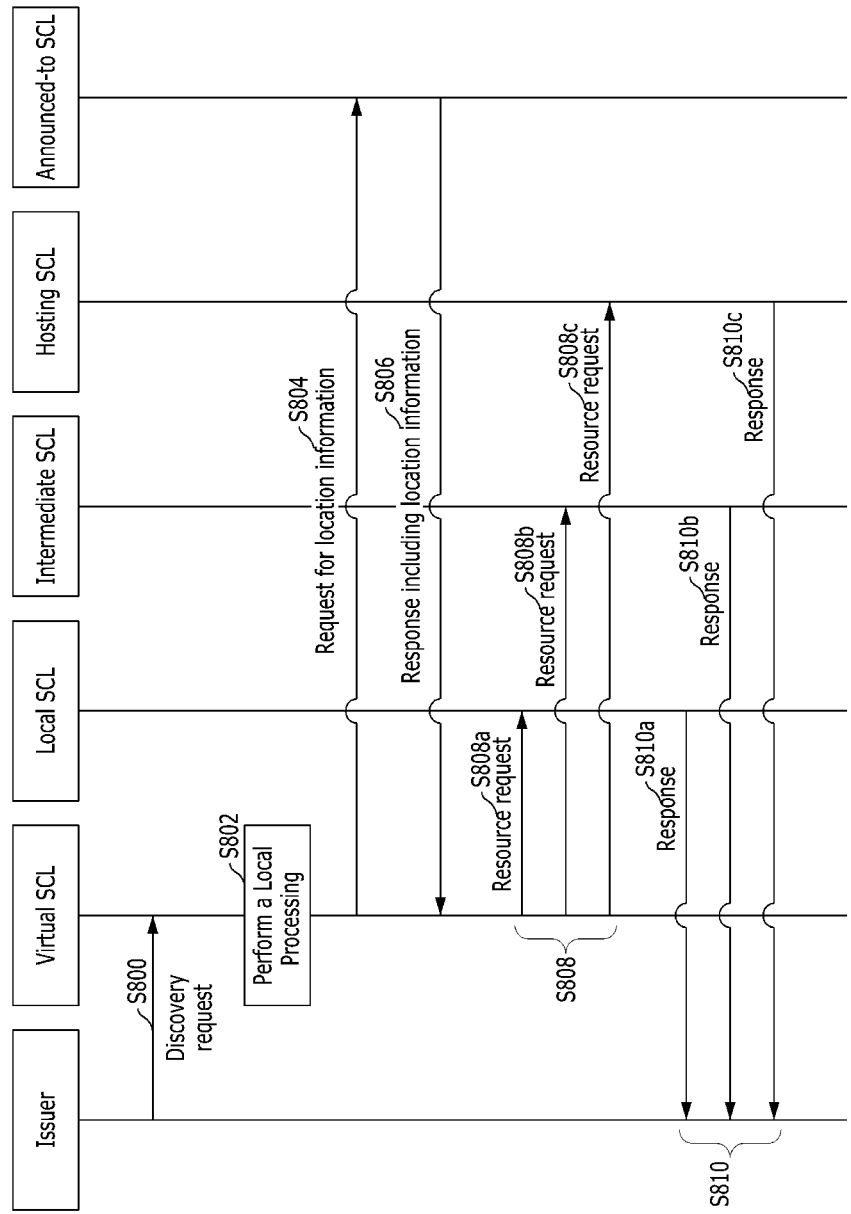
FIG. 8 illustrates a method of providing a substitute resource using a virtual SCL in an M2M network in accordance with at least one embodiment.

Furthermore, the procedure shown in FIG. 6 may be performed (i) when a corresponding M2M network is reconstructed by addition, deletion, and change (modification) of M2M devices, or (ii) when a resource request message is generated from an issuer and a response message is received from an SCL of a corresponding resource through procedures of FIG. 7 and FIG. 8. More specifically, in these cases, correlation information may be changed, and thus, an updated virtual SCL may be created by performing the procedure of FIG. 6 again.

In the embodiment of FIG. 6, correlations between the announced resources may be analyzed, but the present embodiment is not limited thereto. In at least one embodiment, the virtual SCL may be created with respect to all resources of the corresponding M2M network.

FIG. 7 illustrates a method of managing resources in a virtual SCL in accordance with at least one embodiment. Herein, the virtual SCL may be implemented in an M2M entity (e.g., an M2M device and/or an M2M gateway). In other embodiments, the virtual SCL may be implemented as a separate independent entity such as an apparatus including at least one hardware processor.

At step S700, the virtual SCL created in FIG. 6 may monitor whether a request message (e.g., C/R/U/D request for a specific resource) is received from an issuer.

At step S702, when the request message is received from the issuer (Yes—S700), the virtual SCL may analyze information on the specific resource associated with the request message.

At step S704, the virtual SCL may determine whether the corresponding resource is available, based on the analysis result of step S702.

At step S706, when the corresponding resource is available (Yes—S704), the virtual SCL may forward the request message to an SCL of the corresponding resource. In this case, the virtual SCL may also forward hop type information to a corresponding resource SCL. Herein, the hop type information may be forwarded together, in order to reduce a resource preparation time using location information of each resource collected by the virtual SCL. When the location information of the corresponding resource does not exist in the virtual SCL, the hop type information cannot be provided at the first time. However, if the corresponding resource is found, hop type information on the corresponding resource may be accumulated. Therefore, after that, hop type information about the corresponding resource may be provided.

At step S708, the virtual SCL may monitor whether a response message (e.g., a success message) to the request message is received from the corresponding resource SCL.

When the virtual resource or the issuer receives the response message from the corresponding resource SCL (Yes—S708), the virtual SCL may end the procedure.

When the virtual resource or the issuer does not receive the response message from the corresponding SCL within a predetermined time (No—S708), the virtual SCL may proceed to the operations subsequent to step S710 (i.e., the operations using a substitute resource).

Meanwhile, when the resource associated with the request message is unavailable due to failures (e.g., failure of a device or gateway itself, a network failure, and so forth) (No—S704), the virtual SCL may perform operations S710 through S718 of forwarding the request message to the substitute resource.

More specifically, at step S710, when the corresponding resource is unavailable due to failures (Yes—S704), the virtual SCL may retrieve substitute resource candidates using correlation information (i) stored in the virtual SCL, or (ii) indicated by a URI stored in the virtual SCL. That is, the virtual SCL may retrieve substitute resource candidates having correlation values higher than a minimum correlation value, based on information on correlations between the requested resource and other resources. Herein, the minimum correlation value may be previously set as an average value of correlation values between the entire resources, but the present embodiment is not limited thereto. The minimum correlation may be an arbitrary correlation coefficient value previously set by an M2M network operator or an M2M service provider.

At step S712, the virtual SCL may determine whether at least one substitute resource candidate exists, based on the retrieval result of operation S710.

At step S714, when at least one substitute resource candidate exists (Yes—S712), the virtual SCL may determine a substitute resource candidate having the highest correlation, as the substitute resource. In the case that both 'correlation coefficients for reachability of the resources' and 'correlation coefficients for reusability of the resources' are used to determine the substitute resource, a priority between them may be determined according to an M2M service type, an M2M network situation, and/or an M2M service policy. In other embodiments, the priority may be predetermined by an M2M service provider or an M2M network operator.

Meanwhile, at step S720, when at least one substitute resource candidate does not exist (No—S712), the virtual SCL may send a fail message to an issuer. The case that the substitute resource cannot be found may include (i) the case that all the correlations to other resources are equal to or less than the minimum correlation value, or (ii) the case that the corresponding resource cannot be called even though the resources equal to or higher than the minimum correlation value exists.

At step S716, the virtual SCL may forward the request message to a corresponding SCL of the determined substitute resource. In this case, when receiving the request message from the virtual SCL, the SCL of the substitute resource may send a corresponding response message to the virtual SCL and/or the issuer. When the virtual SCL receives the response message from the SCL of the substitute resource (Yes—S718), the virtual SCL may ends the corresponding procedure.

When the virtual SCL does not receive the response message from the SCL of the substitute resource (No—S718), the virtual SCL may re-determine a candidate having the second highest correlation as the substitute resource among the retrieved substitute resource candidates at steps S712 and S714. Then, the virtual SCL may perform the operations of S716 and S718. The virtual SCL may perform the process of re-determining the substitute resource until (i) the response message is received at step S718 or (ii) the operations of S712 through S718 are performed on all substitute resource candidates.

When the virtual SCL does not receive the response message even through the process of re-determining the substitute resource, the virtual SCL may send a fail message to the issuer at step S720.

FIG. 8 illustrates a method of providing a substitute resource using a virtual SCL in an M2M network in accordance with at least one embodiment. FIG. 8 illustrates a method of providing a substitute resource in the case that a resource request associated with an M2M service is performed using a virtual SCL in an M2M network in accordance with at least one embodiment. In particular, FIG. 8 illustrates an interworking relationship among an issuer, a local SCL, an intermediate SCL, a hosting SCL, and an announced-to SCL when performing a response through a substitute resource.

At step S800, an issuer may perform a discovery request for a specific resource. More specifically, the issuer may request a virtual SCL to discover a specific resource. Herein, the issuer is an actor performing a request. The issuer may be an application or an SCL. In this case, the discovery request may be performed using a "RETRIEVE" method.

At step S802, when receiving the discovery request, the virtual SCL may perform a local processing procedure using correlation information (e.g., a correlation table). More specifically, the virtual SCL may perform the local processing procedure using a table (i.e., a correlation table) regarding correlation between resources. The correlation table may be stored in the virtual SCL. That is, the virtual SCL may retrieve a predetermined number of substitute resource candidates through the local processing procedure, and select (or determine) a substitute resource from the retrieved substitute resource candidates. The virtual SCL may determine a plurality of substitute resource candidates according to correlation values. The virtual SCL may determine a substitute resource candidate having the greatest correlation value as the substitute resource.

At step S804, the virtual SCL may request an announced-to SCL to send location information on the selected substitute resource. Herein, the announced-to SCL may have an announced resource associated with the substitute resource selected at step S802. In accordance with another embodiment, the virtual SCL may request the announced-to SCL to send location information on all the substitute resource candidates selected at step S802.

At step S806, the announced-to SCL may send a response message to the virtual SCL. The response message may contain location information on the substitute resource. In accordance with another embodiment, when the virtual SCL requests the announced-to SCL to send the location information on all the substitute resource candidates, the announced-to SCL may send the response message containing the location information on all the substitute resource candidates.

At step S808, the virtual SCL may send a resource request message to an SCL (hereinafter, referred to as "a target SCL") corresponding to the location information on the substitute resource that is received from the announced-to SCL. More specifically, when the target SCL is a local SCL, the virtual SCL may send the resource request message to the local SCL at step S808a. When the target SCL is an intermediate SCL, the virtual SCL may send the resource request message to the intermediate SCL at step S808b. When the target SCL is a hosting SCL, the virtual SCL may send the resource request message to the hosting SCL at step S808c. When the virtual SCL sends the resource request message to the target SCL, the virtual SCL may send hop type information together with the resource request message (i.e., a substitute resource request message). FIG. 8 illustrates the case of directly sending the resource request message (i.e., substitute resource request message) from the virtual SCL to the corresponding target SCL. The resource request message (i.e., substitute resource request message) may be sent through the local SCL and/or the intermediate SCL according to the hop type information. For example, when the target SCL is a hosting SCL and the hop type information represents 2-hop, the resource request message (i.e., substitute resource request message) may reach the hosting SCL through the local SCL and the intermediate SCL.

In other embodiments, as described in operations S804 and S806, when the virtual SCL requests the location information on all the substitute resource candidates and receives the location information on all the substitute resource candidates from the announced-to SCL, the virtual SCL may send the resource request message associated with the corresponding substitute resource candidates in a broadcasting scheme.

At step S810, the corresponding target SCL may directly send a response message responding to the resource request message (substitute resource request message) to the issuer. As described in operation S808, each of steps S810a through S810c may be performed according to which one is the corresponding target SCL. In this case, when the issuer does not receive the response message (e.g., a success response message) from the corresponding target SCL within a predetermined time, the issuer may notify this to the virtual SCL. The virtual SCL may reselect a substitute resource having the second highest correlation value as the substitute resource among the substitute resource candidates determined at step S802. The subsequent processes of steps S804 through S810 may be performed. The above procedures may be repeated until the issuer receives a response message (e.g., a success response message) from any one of the substitute resource candidates.

In other embodiments, the corresponding target SCL may directly send the response message to the virtual SCL. In this case, when the virtual resource does not receive the response message from the corresponding target SCL within a predetermined time, the virtual SCL may reselect a substitute resource candidate having the second highest correlation as the substitute resource among the substitute resource candidates determined at step S802. The subsequent processes of steps S804 through S810 may be performed.

In other embodiments, when the virtual SCL sends the resource request message to the plurality of substitute resource candidates in a broadcasting scheme at step S808, the issuer or the virtual SCL may receive one or more response messages. In this case, the issuer or the virtual SCL may select one of the received response messages. More specifically, the issuer or the virtual SCL may select a response message of a candidate having higher order (i.e., a candidate having higher correlation) among the substitute resource candidates.

Hereinafter, a home network security system in accordance with at least one embodiment will be described. For example, the home network security system may include (i) an acoustic sensor for sensing a sound within a house, (ii) an infrared sensor for sensing a motion of a person or an animal within the house, (iii) an online monitor for monitoring information regarding the outside of the house, and (iv) a video information monitor for recording a video of the house. The home network security system may include an M2M gateway ("GSCL") and a network application (NA). The M2M gateway ("GSCL") may receive information from at least one of the acoustic sensor, the infrared sensor, the online monitor, and the video information monitor, and may transfer the received information to a server (e.g., NSCL). The NA receives indoor monitoring information from the NSCL.

In the case that a failure occurs in an infrared sensor, a typical home network security service using an infrared sensor is stopped until the failure of the infrared sensor is recovered. However, in accordance with at least one embodiment, as a result of the correlation coefficient analysis, when it is determined that an acoustic sensor has a high correlation value to the infrared sensor and thus exhibits an effect similar to the infrared sensor, data may be provided from the acoustic sensor instead of the infrared sensor. Therefore, the home network security service according to the present embodiment may be provided stability without a service interruption.

With respect to e-Health services, correlations for use frequency and similarity of medical instruments may be previously grasped. Therefore, when a patient receives e-Health services using a plurality of medical instruments such as a pulsometer and an electrocardiograph, a repetitively used instrument may be prepared to use a substitute resource immediately, almost without preparation time.

As described above, even in the case that a failure occurs in an M2M network and/or an M2M device, a service may be immediately provided using similar resources. In particular, a virtual SCL may preferentially process a request for resources from an issuer, considering correlation between resources in an M2M network. According to the present embodiment, a use frequency of resources may be considered in order to provide an efficient/rapid M2M service. In the case of a frequently used M2M service, a resource preparation time for providing a service may be effectively reduced, thereby achieving improvement in the entire performance of an M2M network.

In addition, when a failure occurs in a specific instrument, a substitutive instrument may be used immediately. Therefore, a patient may receive a more stable medical service. Furthermore, at least one embodiment of the present embodiment may implement the above-described effects by applying or utilizing the functions proposed in the ETSI standard documents. Therefore, without regard to a specific company or nation, anyone may apply the present invention to any type of product, as long as he/she complies with the ETSI standard.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of performing a resource management in a machine to machine (M2M) network, the method comprising:
   receiving a request message associated with a specific resource from an issuer;
   determining a substitute resource to replace the specific resource, based on correlation information between resources when the specific resource is unavailable;
   obtaining location information of a service capability layer (SCL) where the substitute resource resides; and
   transferring the request message to the SCL of the substitute resource by using the location information.

2. The method of claim 1, wherein at least one of the receiving, the determining, the obtaining, and the transferring is performed by a virtual SCL included in at least one M2M entity in the M2M network.

3. The method of claim 2, wherein the correlation information includes at least one of (i) correlation coefficients for reachability of the resources and (ii) correlation coefficients for reusability of the resources.

4. The method of claim 3, wherein:
   the correlation coefficients for the reachability are calculated based on a history of accesses to each of the resources; and
   the correlation coefficients for the reusability are calculated based on a history of calls from other resources with respect to each of the resources.

5. The method of claim 4, wherein:
   the correlation coefficients for the reachability are calculated using 'device reachability, addressing and repository' (DRAR) and 'gateway reachability, addressing and repository' (GRAR); and
   the correlation coefficients for the reusability are calculated using 'device history and data retention' (DHDR) and 'gateway history and data retention' (GHDR).

6. The method of claim 3, wherein the correlation information includes correlation information between announced resources associated with the M2M network.

7. The method of claim 6, wherein the obtaining the location information includes:
   requesting, by the virtual SCL, the location information to an announced-to SCL; and
   obtaining, by the virtual SCL, the location information of the SCL from the announced-to SCL.

8. The method of claim 1, wherein the location information of the SCL includes a universal resource identifier (URI) of the SCL where the substitute resource resides.

9. The method of claim 1, wherein the transferring the request message includes:
   transferring hop type information of the substitute resource together with the request message.

10. The method of claim 1, wherein the determining the substitute resource includes:
    retrieving one or more substitute resource candidates, based on the correlation information between the resources; and
    determining a substitute resource candidate having a greatest correlation coefficient, as the substitute resource.

11. The method of claim 10, wherein the determining the substitute resource includes:
    when a response message to the request message is not received from the SCL of the substitute resource,
    re-determining a substitute resource candidate having a next-greatest correlation coefficient, as the substitute resource.

12. The method of claim 1, further comprising:
    transferring the request message to an SCL where the specific resource resides, when the specific resource is available.

13. The method of claim 12, wherein the transferring the request message to the SCL of the specific resource further includes:
    transmitting hop type information of the specific resource to the SCL of the specific resource.

14. An apparatus for performing a resource management in a machine to machine (M2M) network, the apparatus comprising:
    a monitoring processor configured to collect attributes of resources associated with the M2M network;
    an analysis processor configured to analyze the collected attributes of the resources and to obtain information on correlation between the resources based on an analysis result of the collected attributes of the resources; and
    a virtual SCL creation processor configured to create a virtual service capability layer (SCL) based on the obtained correlation information,
    wherein the virtual SCL is configured to:
    (i) receive a request message from an issuer;
    (ii) select a substitute resource based on the obtained correlation information, when a resource associated with the request message is unavailable;
    (iii) obtain location information on the selected substitute resource; and
    (iv) transfer the request message to an SCL of the substitute resource by using the location information.

15. The apparatus of claim 14, wherein the obtained correlation information includes at least one of correlation coefficients for reachability of the resources and correlation coefficients for reusability of the resources.

16. The apparatus of claim 15, wherein the virtual SCL is configured to re-determine a substitute resource candidate having a next-greatest correlation coefficient, as the substitute resource, when a response message responding to the request message is not received from the SCL of the substitute resource.

17. The apparatus of claim 15, wherein when transferring the request message to the selected substitute resource, the virtual SCL is configured to transfer hop type information of the substitute resource together with the request message.

18. The apparatus of claim 15, wherein the obtained correlation information is correlation information between announced resources associated with the M2M network.

19. The apparatus of claim 18, wherein the virtual SCL creation processor is configured to update the virtual SCL at least one of (i) when an architecture of the M2M network is changed and (ii) when request and response processes are performed between the resources.

20. The apparatus of claim 14, wherein the virtual SCL is configured to:
    retrieve one or more substitute resource candidates based on the obtained correlation information; and
    determine a substitute resource candidate having a greatest correlation coefficient, as the substitute resource.

* * * * *